UNITED STATES PATENT OFFICE.

EGBERT JUDSON, OF SAN FRANCISCO, CALIFORNIA.

IMPROVEMENT IN EXPLOSIVE COMPOUNDS.

Specification forming part of Letters Patent No. 183,764, dated October 31, 1876; application filed September 21, 1876.

*To all whom it may concern:*

Be it known that I, EGBERT JUDSON, of the city and county of San Francisco, and State of California, have invented an Improvement in Explosive Compounds; and I do hereby declare the following to be a full, clear, and exact description thereof.

In that special class of explosive compounds formed by mixing nitro-glycerine with various gas-producing solid substances, it is usual, in order to promote a rapid decomposition of the entire compound, to reduce the solid substances used to a state of comminution, and to mix them intimately with each other before they receive the nitro-glycerine.

For the purposes of this specification I term these solid substances the "dry mixture." These dry mixtures, as heretofore prepared and used, can only be converted into an explosive by the addition of a large proportion of nitro-glycerine, seldom less than fifteen per cent. being found practically effective, while, in fact, from thirty to forty per cent. are generally used. The necessity for so large a proportion of nitro-glycerine arises from the fact that a small quantity is, in a short time after its introduction, so completely absorbed or taken up by the dry mixture that the compound becomes practically inexplosive. Moreover, these dry mixtures, being in general largely composed of some one of the nitrates, are more or less hygroscopic, and consequently very liable to injury from moisture absorbed from the atmosphere or otherwise.

The object of my invention is to produce a cheap, safe, and powerful explosive compound that shall contain, and be explosive with, a very small proportion of nitro-glycerine.

The mode by which I accomplish this object is to varnish, cement, or coat, as hereinafter described, the grains of nitrate of the dry mixture, and also, if necessary, the carbon, or any other part that may be porous or absorbent, with a varnish or cement composed of combustible substances that will liquefy by heat, or by some highly volatile solvent, which varnish or cement I can make from certain substances that ordinarily form parts of the dry mixture itself.

If the dry mixture, or such part of it as is to receive the varnish or cement, be extremely fine or pulverulent, this operation of varnishing or cementing will granulate it into grains of a suitable size for powder by cementing the finer particles together; but if it be coarser its grains or particles will simply receive the coating or varnishing required by my invention.

After the dry mixture has been treated and prepared according to my invention, it will be found that its grains thus coated, varnished, cemented, or smeared will receive and retain the nitro-glycerine upon their surfaces, or mainly upon their surfaces, with little or no absorption, thus enabling a very small proportion of nitro-glycerine to maintain its continuity throughout the mass, and thereby render the whole explosive; and, further, that the compound will be measurably protected from dampness.

The dry mixtures of the particular class of explosives in question generally contain, in addition to a large proportion of some one of the nitrates, carbon and one or more of the hydrocarbon, resinous, or bituminous substances, and, in addition, sulphur is frequently used. Of the first three ingredients mentioned, there are, under each designation respectively, a large number of substances that may be substituted one for the other, thus allowing variations to an almost unlimited extent. In effect, however, all will accomplish the same purpose in a varying degree, and all may be used in connection with my invention. Cheapness and efficiency combined will determine which substances shall be used, and I consequently proceed to illustrate my invention by stating one of the many formulas which will produce a superior explosive compound, confining myself to the cheap and ordinary ingredients of a dry mixture. Take, by weight, as follows: Sulphur, fifteen parts; resin, three parts; asphalt, two parts; nitrate of soda, seventy parts; anthracite coal, ten parts.

Let the sulphur, resin, and asphalt be melted together and well stirred. Into this mixture, while melted, the nitrate of soda and the coal, both pulverized and thoroughly dried, are to be mixed and well stirred until thoroughly varnished, cemented, or coated by the melted mixture, care being used that the degree of heat be not sufficient to create danger of firing the mass. It is better that both nitrate and coal should be hot when introduced. The entire mixture should thereafter be gently but constantly stirred until so cool that the grains would cease to adhere to each other. The dry mixture is then complete and ready to receive the nitro-glycerine, which may be added as desired. One, two, or three per cent. of nitro-glycerine will now convert the compound into a powerful explosive; or the proportion may be increased at pleasure up to fifteen per cent., or even more.

I do not limit myself to the foregoing statement of ingredients, nor to the particular mode described of forming and applying the varnish, cement, or coating. The statement is only one of a large number of formulas that I might give, to all of which my invention would equally apply. In fact, it will be readily seen that the variations in the substances employed, and in the manner of preparing them, may be made almost numberless; but with all variations my invention demands one thing, to wit, that the grains or particles of the dry mixture shall be coated, cemented, varnished, or smeared with some combustible substance offering resistance to absorption of nitro-glycerine and of water, and at the same time it must be capable of bearing any ordinary degree of heat to which the explosive compound produced may be exposed in transporting or keeping.

I have found that many resinous gums and various bituminous substances may be used for the varnish or cement herein mentioned; but most of them are objectionable on account of high cost or otherwise. Sulphur alone may be used, and will form a very good varnish or cement; or, on the other hand, it may be omitted entirely. Some very volatile varnishes might be applied cold to the dry mixture, or certain of its parts, and would answer the purpose I have sought to a greater or less extent.

The ingredients which form the coating, varnish, or cement may be applied without first melting them. To do this, first grind each of the materials of the dry mixture; then, leaving out the carbon, mix the others all together and proceed to heat them well, all the time stirring, and continue until the whole is thoroughly varnished, cemented, or coated. While the mixture is cooling the stirring must be carefully continued until the grains cease to adhere to each other. Then add the pulverized carbon, which must be perfectly dry, mix well, and afterward put in the nitro-glycerine. When carbon is used that is not porous or absorbent, it is not necessary that it should be varnished, cemented, or coated. In that case it may only be necessary to varnish, cement, or coat the nitrate of the mixture.

While the dry mixture may not be entirely non-absorbent after it has been treated by my varnishing, cementing, or coating process, it is sufficiently so as to mainly counteract the absorption of the nitro-glycerine, as well as to check the tendency to deliquescence. I therefore term the treated dry mixture "non-absorbent," in contradistinction to such absorbent mixtures as have heretofore been used in this class of powder.

The explosive compound made according to my invention is exploded substantially in the same manner as any other of the so-called nitro-glycerine powders.

I am aware that grains of ordinary gunpowder have been heretofore polished to render them, to a degree, non-deliquescent; and I am also aware that heretofore ordinary gunpowder has been treated with nitro-glycerine to form an explosive compound.

Having thus described my invention, what I claim, and desire to secure by Letters Patent, is—

1. A powder or explosive compound of the class mentioned, consisting of particles or grains of gas-producing material rendered conglomerate and non-absorbent by the treatment specified, and rendered explosive by a coating of nitro-glycerine, substantially in the manner and for the purposes set forth.

2. In the manufacture of a powder or explosive composition, the process set forth for forming the conglomerate grains, consisting, essentially, in stirring the dry powdered gas-producing material into a melted adhesive combustible non-absorbent material, substantially as set forth.

In witness whereof I have hereunto set my hand and seal.

EGBERT JUDSON. [L. S.]

Witnesses:
 OLWYN T. STACY,
 JNO. L. BOONE.